Aug. 21, 1951    G. E. HOWARD    2,564,783
GLASS MELTING FURNACE AND METHOD
Filed Nov. 2, 1948    3 Sheets-Sheet 3

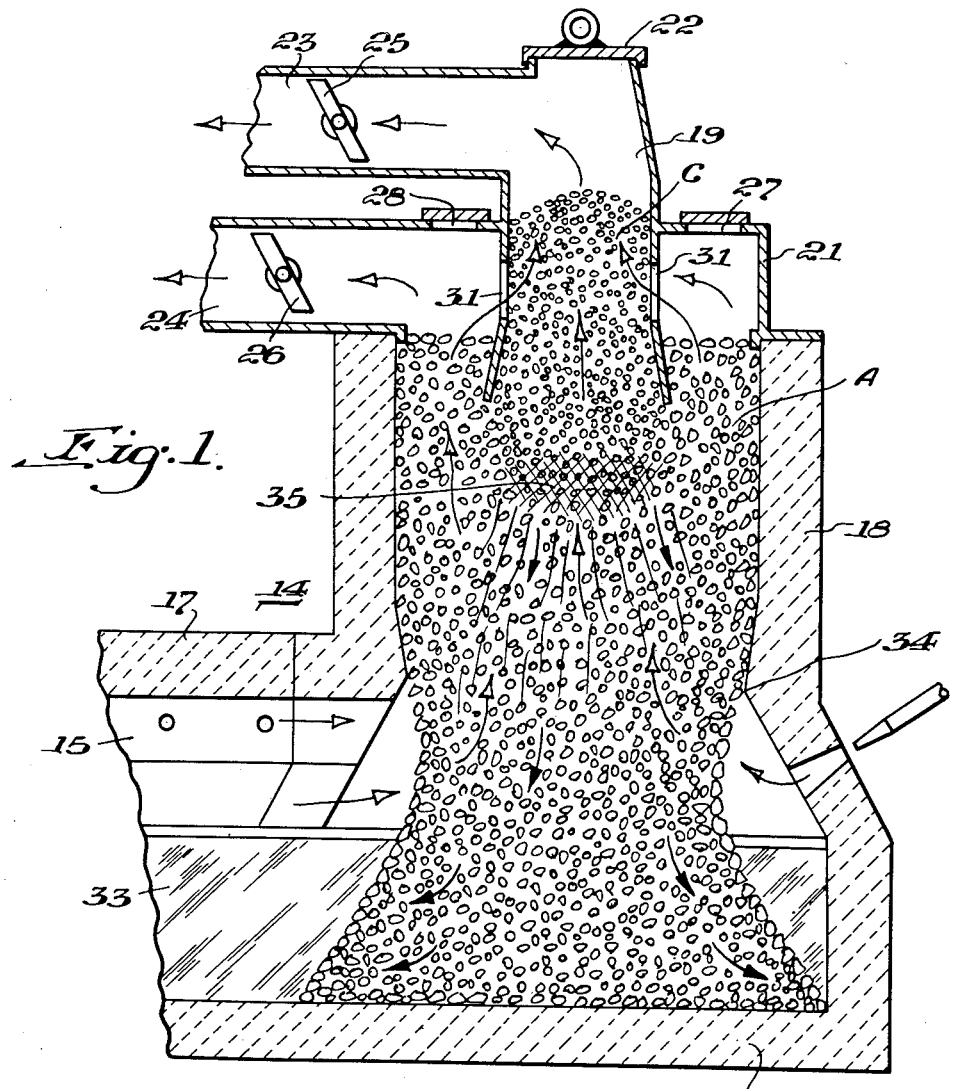
Aug. 21, 1951 — G. E. HOWARD — 2,564,783
GLASS MELTING FURNACE AND METHOD
Filed Nov. 2, 1948 — 3 Sheets-Sheet 1
INVENTOR.
GEORGE E. HOWARD.
BY Archworth Martin
his ATTORNEY

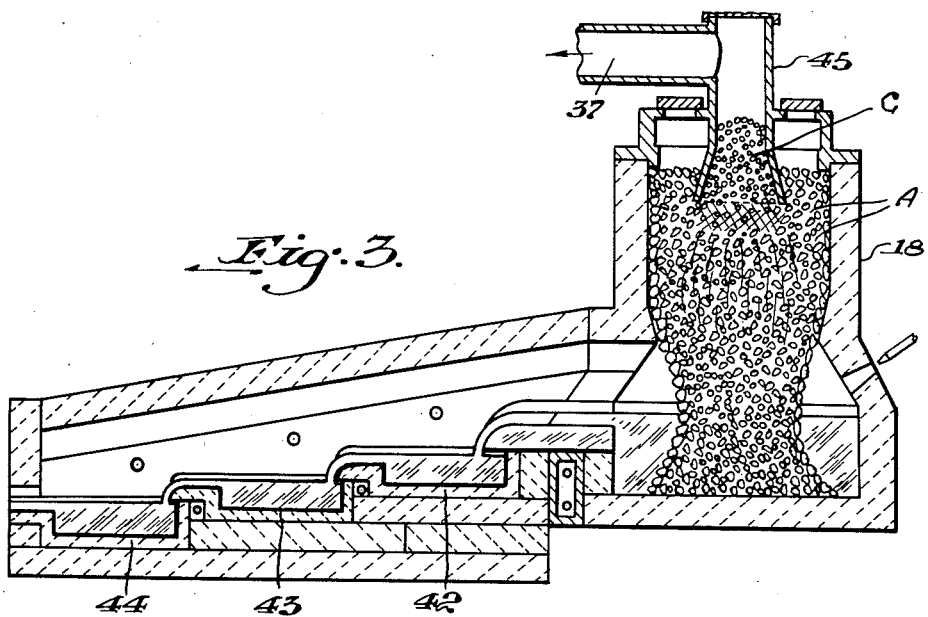
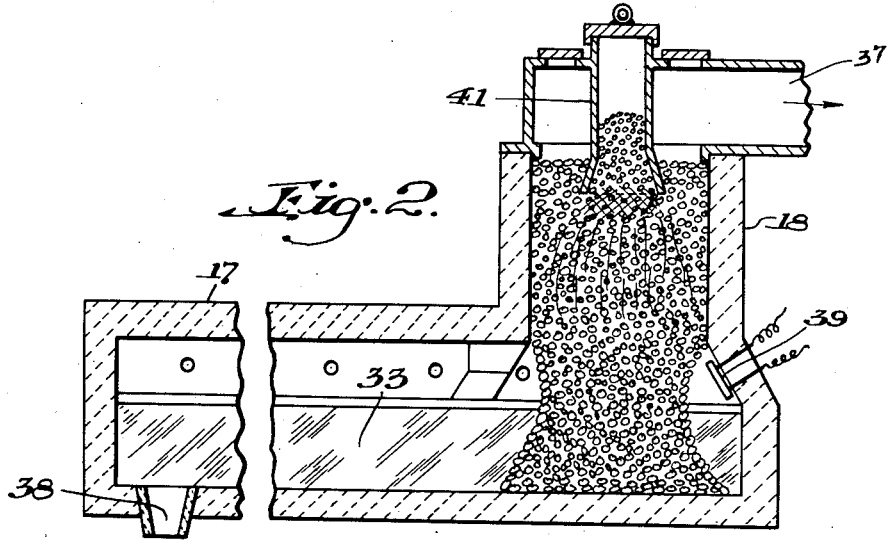
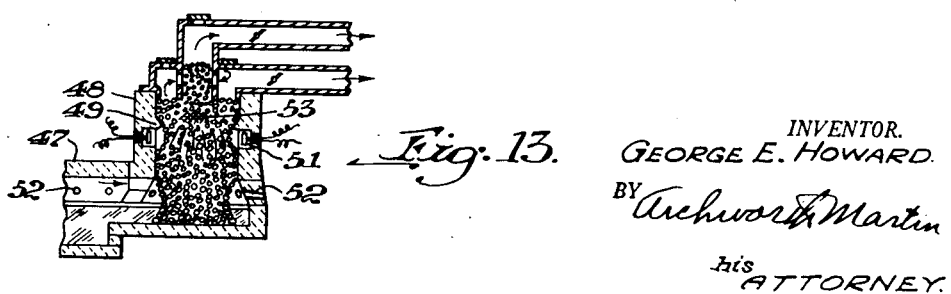

INVENTOR.
GEORGE E. HOWARD
BY Archworth Martin
his ATTORNEY.

Patented Aug. 21, 1951

2,564,783

UNITED STATES PATENT OFFICE 2,564,783

GLASS MELTING FURNACE AND METHOD

George E. Howard, Butler, Pa.

Application November 2, 1948, Serial No. 57,935

7 Claims. (Cl. 49—54)

This invention has for one of its objects the provision of an improved apparatus and method that is particularly suited for the melting of glass-forming batches.

Another object of my invention is to provide a feeding apparatus and method whereby there is a pronounced saving of fuel, in that the batch material is fed in such manner that there are wider areas of contact between it and the heating gases than is the case with ordinary methods of glass melting, and because there is much less radiation of heat of the furnace to the atmosphere, because of the relatively small areas of engagement between the heating gases and the inner surfaces of the furnace walls, and because a smaller furnace can be used for the production of glass at any given rate.

Another object of my invention is to provide a melting arrangement of such form that the melting tanks will have longer life and cheaper refractory materials may be employed.

A further object of my invention is to provide a melting method whereby there is better uniformity in the glass produced.

Still another object of my invention is to procide a means and a method whereby less "seed" and "string" is present in the glass at the completion of a glass-melting operation.

Figure 4:
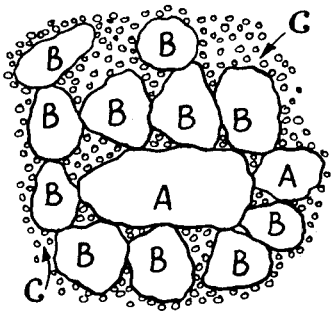
Figure 5:
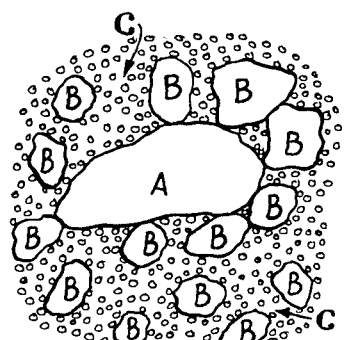
Figure 6:
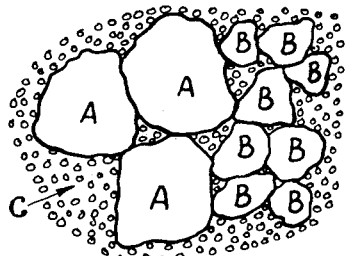
Figure 7:
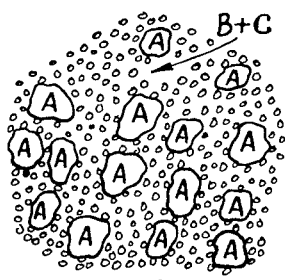
Figure 8:
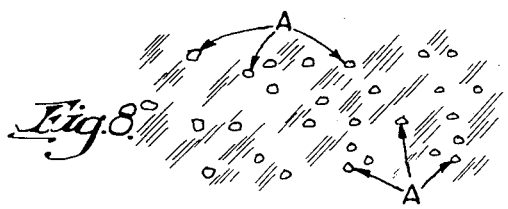
Figure 9:
Figure 10:
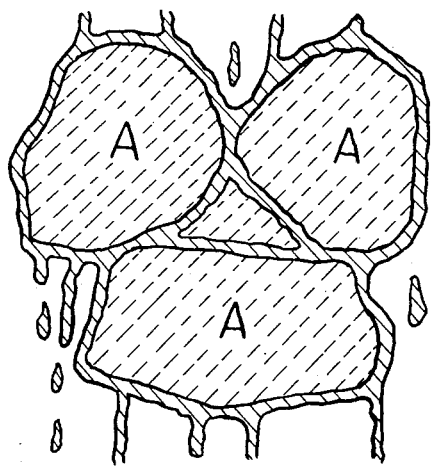

Some of the forms which my invention may take are shown in the accompanying drawings wherein Figure 1 is a vertical sectional view of a melting furnace of the shaft type; Fig. 2 shows a modification of the structure of Fig. 1, with a more complete illustration of the fore-hearth of the furnace; Fig. 3 shows a modification of the structure of Fig. 2; Figs. 4, 5, 6 and 7, show various arrangements of glass batch particles in the old method at various stages of melting; Fig. 8 shows schematically the arrangement of batch particles at a late stage in the old melting process; Fig. 9 shows the batch or mass of Fig. 8 at a still later stage of melting, and just previous to the complete plaining or refining of the glass; Fig. 10 shows, on an enlarged scale, the manner in which the liquified batch particles of lower melting point move over the silica lumps to effect the solution and incorporation of the silica into the glass by my method; Fig. 11 is schematically representative of a portion of the glass batch which I may employ; Fig. 12 is schematically illustrative of a conventional glass batch with relative quantities of the batch materials specified thereon, and Fig. 13 shows still another form of stack furnace.

Referring first to Fig. 1, a portion of the melting furnace is represented generally by the numeral 14, it being understood that this furnace will be extended in fore-hearth form at 15 to a discharge spout or feeder apparatus as in the case of Fig. 2 or Fig. 3 and that the usual burners will be provided through the side walls of the furnace. The furnace has the usual bottom and side walls to form a collecting basin 16 for the molten glass, and a roof or cover plate 17. A shaft portion 18 extends upwardly from the roof 17 to receive the glass batch and hold it in the form of a column that is supported by the basin 16.

A bell or hopper 19 is supported upon metal framework 21 and extends somewhat into the shaft 18, the bell being provided with a cover plate 22 through which some of the batch materials will be introduced as will be hereinafter explained. Draft or exhaust flues 23 and 24 through which the gases may be drawn by either natural or forced draft communicate with the bell, the flue 24 communicating also with the space surrounding the lower portion of the bell. The flues are provided with dampers 25 and 26, respectively. Cover plates 27 and 28 are provided for openings through which the major portion of the silica is fed into the furnace. The heating gases from the burners will be moved to and through the batch in directions generally indicated by the light arrows.

Whereas in the conventional practice of melting glass batches, the batch mixture which may suitably comprise one part lime, two parts soda and seven parts silica are fed into the furnace simultaneously and the heat applied only to the surface of the batch in the melting tank, I supply the lime and soda or other fluxing ingredients into the furnace independently of the major portion of the silica. For example, the material that is fed into the bell 19 may be in the form of briquettes C comprising one part lime, two parts soda and three parts finely-divided silica, the additional silica which is required being fed in the form of large lumps A (perhaps 3 inches in diameter) through the openings 27—28. There may be variations in this procedure as for example the omission of lime or of silica from the briquettes that are fed into the bell, in which case the lime B and the required amount of silica would be introduced through the openings at 27—28. Cullet can, of course, be introduced into the bell or into the shaft 18 directly.

The soda, lime and silica fed into the bell 19 may suitably be fines shaped to briquette form. The silica or ganister lumps A will be fed in large quantities to approximately fill the shaft 18 since the melting of the fluxing materials fed through the bell will result in the gradual absorption of only the amount of silica required for the glass. For example, the final result may be a glass comprising 10% lime, 20% soda and 70% silica.

The upward flow of heating gases as indicated by the light arrows will be controlled somewhat by the dampers 25 and 26, thus the amount of gases which will flow through the narrow slot-like openings 31 and through the briquettes in the bell 19 will be controlled by the damper 25 and the products of combustion will tend to pass more through the coarse silica lumps A. In order to effect more rapid melting of the fluxing materials in the bell, the damper 26 will be moved to a more restricting position than the damper 25. In any event, the gases are brought into engagement with practically all sides of the batch particles, thus effecting more rapid transfer of heat to them, than if the batch materials were simply fed into a tank containing some melted batch in liquid condition and heat applied only to the upper exposed surface thereof as has been common practice.

As the briquettes passing through the bell 19 melt at 35, the liquid will travel downwardly and wash over the more refractory lumps A that are preferably of silica, as indicated schematically in Fig. 10. In passing over the silica lumps, the molten material will pick up by solution further molecules of silica until the liquid has passed downwardly into the body of the glass 33 in the receptacle or basin 16.

The stack 18 is preferably of circular form in horizontal section and has a restriction or throat 34 to partly support the column of glass-making material. This arrangement will determine the gradient of the silica lumps as they come to rest upon the bottom of the furnace, and serves an important purpose because it determines to a considerable extent the downward rate of travel of the particles of batch. There will be no erosion or solution of the silica particles into the liquid except where they contact with the molten flux materials at points below the bell 19. Soda melts at a low temperature of approximately 1500° F. while silica melts at 3100° F., and lime at a still higher temperature. However, by chemical action at certain temperatures, the soda unites with the silica and lime through solution of the silica lumps. When the briquettes in the bell 19 pass from a solid to a liquid stage, they go through an intermediate state we call "pastifying" where the viscosity is very high. Such pastifying zone is indicated at 35 at which point the briquettes are not sufficiently fluid to freely pass through the spaces between the silica lumps A. The extent and area of this pastifying zone is a measure of the temperature of the briquettes, and in this case, will be fairly small in area and in height, as the briquettes have been preheated prior to reaching this zone 35. Likewise after the briquettes have reached a liquid stage, viscosity becomes lower, since they contain a smaller percentage of silica than the finished glass product in the pool 33.

Since the pasty condition at 35 may retard the upward flow of gases and therefore tend to deflect too much of the gases to the space between the bell and the sides of the stack, I may introduce some of the large silica lumps through the opening 22 to mingle with the briquettes, so that there will not be an unbroken pastified zone at the lower end of the bell. The proportion of ganister introduced in this manner however will be small compared to that at 27—28.

The surfaces of the large silica lumps erode rather slowly as their proportion of surface area is small compared to that of the finely ground sand grains in the briquettes. Therefore, the control of the percentage of silica in the finished glass will be dependent upon the sizes of the silica lumps A and also by the length of time that the lumps are exposed to the liquid passing over them and by the temperature of the heating gases of combustion. Thus if the briquettes are heated to a high temperature in the bell, to a more liquid condition and flow with relative rapidity through the ganister lumps A, as indicated by the solid arrows, the glass batch at 33 will contain a larger percentage of silica from erosion and solution, due to the downward movement of the molten briquette material.

Another feature of advantage in having the molten glass materials from the bell 19 trickle down in the form of thin coatings over the large silica lumps or by drops or strings in the spaces between the lumps is because this will result in the better displacement or expulsion of the gases of chemical reaction, so that more readily dispersible minute bubbles will be formed rather than larger blebs, and there will also be less "seed" or undissolved portions of sand. Therefore, when the liquid enters the pool 33, substantially no further refining or plaining will be required in order to clear the glass.

An example of the condition in conventional glass melting at various stages is shown in Figs. 4, 5, 6, 7, 8 and 9, where the silica particles A are immersed and in Fig. 8 have become very small and are scattered in the liquid glass. As these particles, or a considerable portion of them, are necessarily separated, they do not completely coalesce in the melting tank and have to be carried to a separate or plaining compartment where the particles coalesce but leave a condition shown in Fig. 9 known as a "glycerine and water" effect. As this action is molecular, it is necessary for particles of glass to contact the remaining particles of silica to completely effect this solution. As the only means for doing this are the relatively slow convection currents, there is insufficient movement between fine strings or particles A of silica and the enclosing glass (Fig. 9), to effect rapid solution.

Per contra, in the invention herein described and known as the erosion furnace, the particles of silica are completely dissolved when the briquettes are melted and a desired temperature reached. There is no condition shown as in Fig. 9, or not to the same extent, for the reason that the remaining percentage of silica is obtained by the erosion or washing action of the moving molecules of the glass liquid dissolving, by molecular actions and erosion of the relatively stationary large silica lumps, additional percentages of silica. The temperature in the interior of the shaft furnace will be higher than the temperature of the glass in a conventional furnace, as the flames contact over a larger surface of the glass materials and the temperature of both of the glass and the flames will be higher because of the much greater ratio of heat-absorbing of the glass-making materials to heat-radiating surface of the furnace walls. Also the vertical walls of the shaft are not as pronouncedly subject to the erosive action of the heating gases.

As the glass passes from the shaft furnace to the storage pool 33 from which it is discharged to feeders or fabricating devices, it will be entirely or largely cleared of seed, string and bubbles as above explained, so that little or no refining of the glass is required and this forehearth or extension of the furnace can be much smaller than is usually required. The purpose of my forehearth will be primarily to control the temperature of the glass for proper feeding to a fabricating unit. The forehearth or extension can conveniently be heavily insulated, with consequent lower requirement for fuel.

In Fig. 2, a simpler draft arrangement is shown in that a single exhaust or draft pipe 37 is used on the shaft 18, the furnace being extended to show a discharge bushing at 38, and the operation of the furnace being otherwise similar to that of Fig. 1. Electric heaters as at 39 may be used instead of gas burners at the lower end of the shaft. In this case, all of the gases to the flue 37 will flow around the bell 41.

An arrangement such as shown in Fig. 3 can be used, to permit the passage of the finished glass from the shaft furnace at 18 through a series of pots or pools 42, 43 and 44 with a gradual lowering of temperature. In this arrangement, all of the heating gases to the flue 37 flow upwardly through the bell 45. The erosion of the walls of the pots or storage tanks will be low, as neither exceedingly high temperatures nor the dissolving factor will be present to any considerable degree at those locations. The pots 42, 43 and 44 may be lined with enamel such as the material used for lining plate-glass melting pots, to render them less pervious to solution or erosion at the fabricating temperatures.

Referring now to Fig. 13, I show a furnace 47 that is similar to the furnace of Fig. 1, but wherein the stack 48 has a choke formed therein at 49 to retard downward movement of the ganister. Immediately below the choke 49 and well above the bottom of the stack, I provide heating elements 51 of the electrode type, but gas burners can be used. There can be either a single annular heating space at this zone, or a plurality of combustion spaces distributed around the stack wall with a heating element in each space.

The average temperature of the contents in the shaft will thereby be higher, thus increasing the melting capacity. The temperature drop above the burners at the ports 52 may be very rapid and the additional heating capacity at 51 will give the desired high temperature at approximately the level of the pastified mass at 53, thus reducing the time and area of transition from a pastified to a liquid condition and allowing freerer flow of the heating gases past the pastifying zone, to the flues.

The quantity or tonnage of glass production will be determined, in part, by the rapidity of conversion of the pastified mass at 53 into liquid. Where gas burners are used, a small amount of oxygen may be added to the gas mixture to increase the temperature at this zone.

It will be understood that the furnace of Figs. 1, 2 and 3 may each be similarly provided with additional heating means at a plane slightly below the bell.

The restrictions in the shaft as shown at 34 in Fig. 1, for example, may sometimes result in the arching over of the batch material, or the reduction thereof to a very small column, the main column being principally supported at that plane of constriction. This may be advantageous, in that the large horizontal area at this lower portion of the column will be effectively exposed to the heating gases.

I claim as my invention:

1. A melting furnace comprising a collecting basin having side walls that extend upwardly to a plane above the maximum level of molten glass in the basin, to provide a heating space, a roof at the upper edges of the side walls, a shaft extending upwardly from the roof, through which glass-making materials can be introduced in the form of a column, means for introducing a stream of material centrally of the shaft, means for introducing additional material into the shaft in surrounding relationship to the said stream, to form the said column, and means for effecting controlled flow of heating gases through the two streams individually before they merge within the shaft.

2. The method of melting glass-making materials, which comprises feeding the materials to a melting hearth, in the form of a column, the materials having the lower melting points being fed separately from the other materials, and from a higher plane in the melting chamber than are said other materials, and in the form of a stream that is encompassed at its lower portion, by the said other materials which are in the form of lumps larger than the first-named materials.

3. The method of melting glass-making materials, which comprises feeding the materials downwardly to a melting hearth, in the form of a column, the materials having the lower melting points being fed separately from the other materials, and from a higher plane in the melting chamber than are said other materials, the said other material being in the form of lumps of relatively large size and fed into the path of the first-named materials.

4. The method of melting glass-making materials, which comprises feeding the materials downwardly to a melting hearth, in the form of a confined column that is initially divided along vertical lines into batch materials of unlike composition and lump size, and directing a flow of heating gases upwardly through the column, the larger lumps having a higher melting point than the other materials.

5. The method of melting glass-making materials, which comprises feeding batch materials having a relatively low melting point in segregated relation to other batch materials of larger lump size and having a higher melting point, confining the materials in a column, supplying heat to the batch at a temperature substantially above the melting point of the first-named batch materials but of lower temperature than the melting point of the second-named batch materials, and directing the first-named materials into the path of the second-named materials.

6. The method of melting glass-making materials, which comprises feeding batch materials of fluxing nature to a furnace, in the form of a vertical stream, feeding relatively large lumps of more highly refractory glass batch material to the furnace in surrounding relationship to the first-named stream, and thence into the path of the stream, and directing heating gases upwardly through the column of the said batch materials.

7. The method of melting glass-making materials, which comprises feeding fluxing materials and a portion of the more highly refractory material of the batch in a downwardly-directed stream, the larger portion of the more highly refractory material being in the form of lumps larger than the fluxing materials and being fed into surrounding relationship to the said stream, and directing heating gases through the batch materials.

GEORGE E. HOWARD.

REFERENCES CITED

The following references are of record in the file of this patent:

UNITED STATES PATENTS

| Number | Name | Date |
| --- | --- | --- |
| Re. 20,828 | Powell | Aug. 16, 1938 |
| 805,139 | Hitchcock | Nov. 21, 1905 |
| 1,217,340 | Pease | Feb. 27, 1917 |
| 1,610,376 | Hitner | Dec. 14, 1926 |
| 1,860,082 | Drake | May 24, 1932 |
| 2,284,398 | Kutchka | May 26, 1942 |
| 2,294,373 | Batchell | Sept. 1, 1942 |